(12) United States Patent
Brinkhous et al.

(10) Patent No.: US 7,661,961 B2
(45) Date of Patent: Feb. 16, 2010

(54) ELECTRICAL CONNECTION GUIDE ASSEMBLY FOR BREAK-APART PERSONAL MOBILITY VEHICLE

(75) Inventors: Douglas G. Brinkhous, Larchwood, IA (US); Craig C. Ulmer, Larchwood, IA (US)

(73) Assignee: Ranger All Season Corporation, George, IA (US)

( * ) Notice: Subject to any disclaimer, the term of this patent is extended or adjusted under 35 U.S.C. 154(b) by 0 days.

(21) Appl. No.: 12/108,208

(22) Filed: Apr. 23, 2008

(65) Prior Publication Data

US 2008/0261435 A1 Oct. 23, 2008

Related U.S. Application Data

(60) Provisional application No. 60/926,057, filed on Apr. 23, 2007.

(51) Int. Cl.
*H01R 11/30* (2006.01)

(52) U.S. Cl. .......................................... 439/35; 439/374

(58) Field of Classification Search .................. 439/34, 439/35, 374, 247, 248; 280/422; 320/104
See application file for complete search history.

(56) References Cited

U.S. PATENT DOCUMENTS

| | | | | |
|---|---|---|---|---|
| 3,628,811 | A | * | 12/1971 | Rivers ......................... 280/421 |
| 3,832,501 | A | * | 8/1974 | Amnotte .................. 200/61.19 |
| 3,915,476 | A | * | 10/1975 | Burkle ........................ 280/422 |
| 4,061,407 | A | * | 12/1977 | Snow ........................... 439/35 |
| 4,842,524 | A | * | 6/1989 | Hopkins et al. ............... 439/35 |
| 5,238,082 | A | | 8/1993 | Stegeman et al. ............ 180/208 |
| 5,288,094 | A | * | 2/1994 | Putnam ....................... 280/420 |
| 5,306,156 | A | * | 4/1994 | Gibbs et al. ................... 439/34 |
| 5,487,680 | A | * | 1/1996 | Yamanashi ................... 439/552 |
| 6,159,019 | A | * | 12/2000 | Norizuki et al. ............... 439/34 |
| 6,450,834 | B1 | * | 9/2002 | Polgar et al. ................. 439/546 |
| 6,641,420 | B2 | * | 11/2003 | Blanchfield et al. ......... 439/247 |
| 6,695,081 | B2 | | 2/2004 | Chu et al. ................... 180/65.1 |
| 6,808,413 | B2 | * | 10/2004 | Plant et al. .................. 439/527 |
| 6,979,229 | B1 | * | 12/2005 | Liao et al. ................... 439/660 |
| 7,074,084 | B2 | * | 7/2006 | Shuey et al. ........... 439/607.32 |
| 7,129,595 | B2 | * | 10/2006 | Reed et al. ..................... 290/46 |
| 7,371,110 | B2 | * | 5/2008 | Murakami et al. .......... 439/557 |
| 2002/0039852 | A1 | * | 4/2002 | Scheunpflug et al. ....... 439/247 |
| 2004/0038557 | A1 | * | 2/2004 | Mattern et al. ................ 439/35 |

OTHER PUBLICATIONS

Pride Mobility Products Corp, "Elite Traveller" Owner's Manual, pp. 30-31.

(Continued)

*Primary Examiner*—Neil Abrams
*Assistant Examiner*—Harshad C Patel
(74) *Attorney, Agent, or Firm*—Westman, Champlin & Kelly, P.A.

(57) ABSTRACT

A personal mobility vehicle includes a first vehicle unit and a second vehicle unit. A connection assembly, for electrically coupling a first electrical plug-in unit fixedly mounted to the first vehicle unit and a second electrical plug-in unit fixedly mounted to the second vehicle unit, includes a guide disposed on the second vehicle unit intermediate the first electrical plug-in unit and the second electrical plug-in unit. The first electrical plug-in unit has a first plurality of electrical wires and has an outer configuration. The second electrical plug-in unit has a second plurality of electrical wires. The guide has an aperture sized to accept the outer configuration of the first electrical plug-in unit.

10 Claims, 14 Drawing Sheets

OTHER PUBLICATIONS

Pride Mobility Products Corp., "Sundancer" Owner's Manual, pp. 30-32.
Pride Mobility Products Corp., "Revo" Owner's Manual, pp. 32-34.
Pride Mobility Products Corp., "Jazzy 1113" Owner's Manual, pp. 21-23.
Golden Technologies, "Liteway" Owner's Manual, pp. 19-24.

* cited by examiner

ELECTRICAL CONNECTION GUIDE ASSEMBLY FOR BREAK-APART PERSONAL MOBILITY VEHICLE

REFERENCE TO RELATED APPLICATIONS

This application claims priority from, and hereby incorporates by reference, U.S. Provisional Application Ser. No. 60/926,057, filed Apr. 23, 2007, entitled "Electrical connection guide assembly for break-apart personal mobility vehicle."

BACKGROUND

Personal mobility vehicles that are separable into discreet components for transportation and storage are known. One example of such a vehicle is illustrated in U.S. Pat. No. 5,238,082, incorporated herein by reference.

In a break-apart personal mobility vehicle, electrical connections often must be made between components that separate. For example, electrical motors or other features (e.g., lights) are mounted on a rear section of the vehicle, while controls therefore may be mounted on a front section of the vehicle. In addition, power supply components (e.g., battery packs) typically are separable from the vehicle. Traditionally, wires between such electrical components and their associated separable plugs had to be manually assembled when putting the vehicle together and manually disassembled when breaking the vehicle apart. This manual manipulation of separable plug components required additional time and steps in assembly and disassembly, and also required a certain degree of dexterity and strength.

SUMMARY

In one aspect, a connection assembly is disclosed for electrically coupling a first electrical plug-in unit and a second electrical plug-in unit of a personal mobility vehicle (comprising a first vehicle unit and a second vehicle unit). The connection assembly comprises the first electrical plug-in unit, which is fixedly mounted to the first vehicle unit, comprises a first plurality of electrical wires, and comprises an outer configuration, and the second electrical plug-in unit, which is fixedly mounted to the second vehicle unit and comprises a second plurality of electrical wires. The connection assembly also comprises a guide disposed on a second vehicle unit and intermediate the first electrical plug-in unit and the second electrical plug-in unit, with the guide comprising an aperture sized to accept the outer configuration of the first electrical plug-in unit.

In another aspect, a method is disclosed of electrically coupling a first electrical plug-in and a second electrical plug-in unit of a personal mobility vehicle (comprises a first vehicle unit and a second vehicle unit). The first electrical plug-in unit is fixedly mounted to the first vehicle unit, comprises a first plurality of electrical wires, and comprises an outer configuration, and the second electrical plug-in unit is fixedly mounted to the second vehicle unit and comprises a second plurality of electrical wires. The method comprises guiding an outer configuration of the first electrical plug-in unit through an aperture disposed on the second vehicle unit while connecting the first vehicle unit and the second vehicle unit.

In another aspect, a connection assembly is disclosed for electrically coupling a front electrical plug-in unit and a rear electrical plug-in unit of a personal mobility vehicle (comprising a first vehicle unit and a rear vehicle unit). The connection assembly comprises the front electrical plug-in unit, which is fixedly mounted to the front vehicle unit, comprises a first plurality of electrical wires, and comprises a generally rectangular outer configuration, and the rear electrical plug-in unit, which is fixedly mounted to the rear vehicle unit and comprises a second plurality of electrical wires. The connection assembly further comprises a guide comprising a panel disposed on the rear vehicle unit and intermediate the front electrical plug-in unit and the rear electrical plug-in unit, the guide comprising a rectangular aperture sized to accept the outer configuration of the first electrical plug-in unit, wherein the panel contacts the first vehicle unit and the first vehicle unit and the second vehicle unit are connected, and wherein the first vehicle unit comprises a latch that holds the panel in contact with the first vehicle unit.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Figure 1:
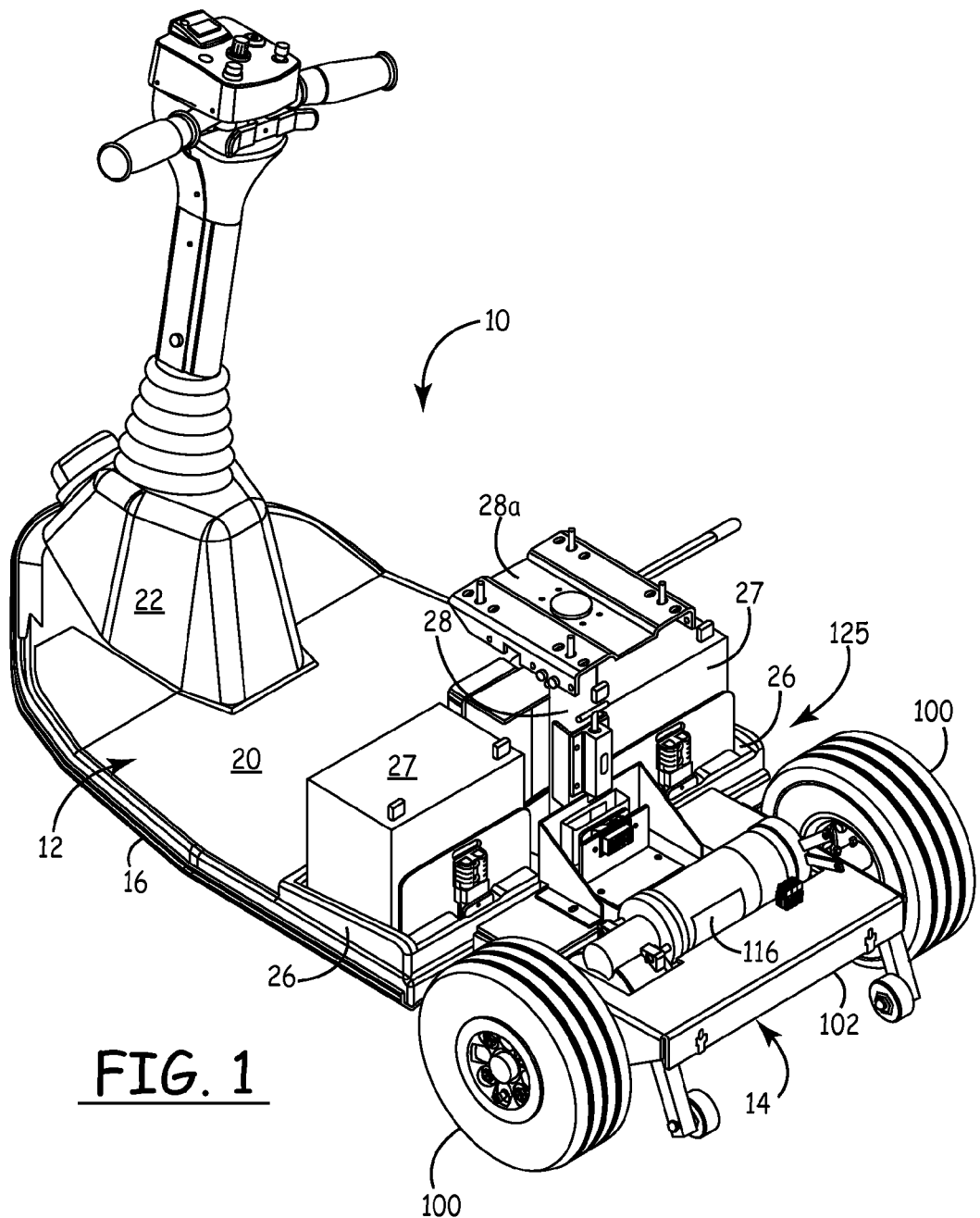
FIG. 1 is an isometric view of a personal mobility vehicle incorporating an electrical connection guide assembly (with a portion of its seat assembly removed for clarity of illustration).

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

FIGS. 1-14 illustrate a personal mobility vehicle 10 similar to that disclosed in U.S. Pat. No. 5,238,082. The vehicle 10 includes a front unit 12 and a rear unit 14. Where applicable, reference numerals from U.S. Pat. No. 5,238,082 will be used in referring to like components in FIGS. 1-14. In an exemplary embodiment, the front unit has a frame 16, a floor pan 20, a forward wheel enclosure 22 (for a forward wheel 47, shown in FIG. 4) and a pair of battery supports 26 for supporting removable batteries 27. A seat extension 28 is rigidly fastened to the frame 16 of the front unit 12 to extend above the batteries 27. A seat support plate 28a is mounted on top of the seat extension 28 to support a seat 30 (see FIG. 2). In FIGS. 1, 4, 5, 6, 7 and 11, the seat has been removed for clarity of illustration. The rear unit 14 of the vehicle 10 includes a pair of tires 100 that are operably connected to a reversible motor 116 mounted on the rear unit 14. A cover for portions of the rear unit 14 has been removed in FIGS. 1-5 and 9-10, for clarity of illustration. The cover is seen in FIG. 11, however. While the illustrated vehicle 10 is a scooter of the type having three wheels, it is it is contemplated that the connection assembly disclosed herein is applicable to four wheel scooters, powered wheelchairs and other break-apart personal mobility vehicles.

Figure 2:
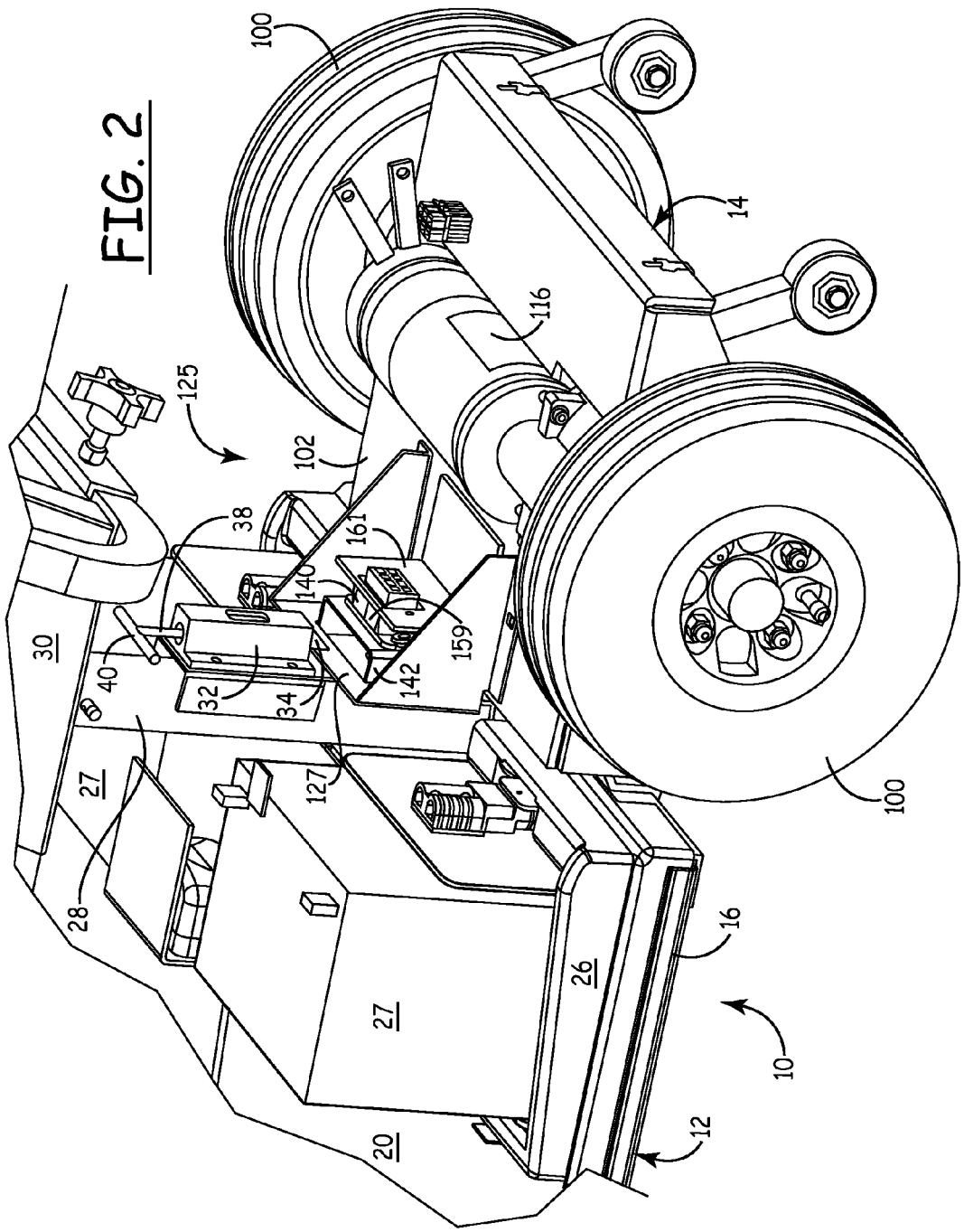
FIG. 2 is an enlarged view of a portion of FIG. 1.
Figure 3:
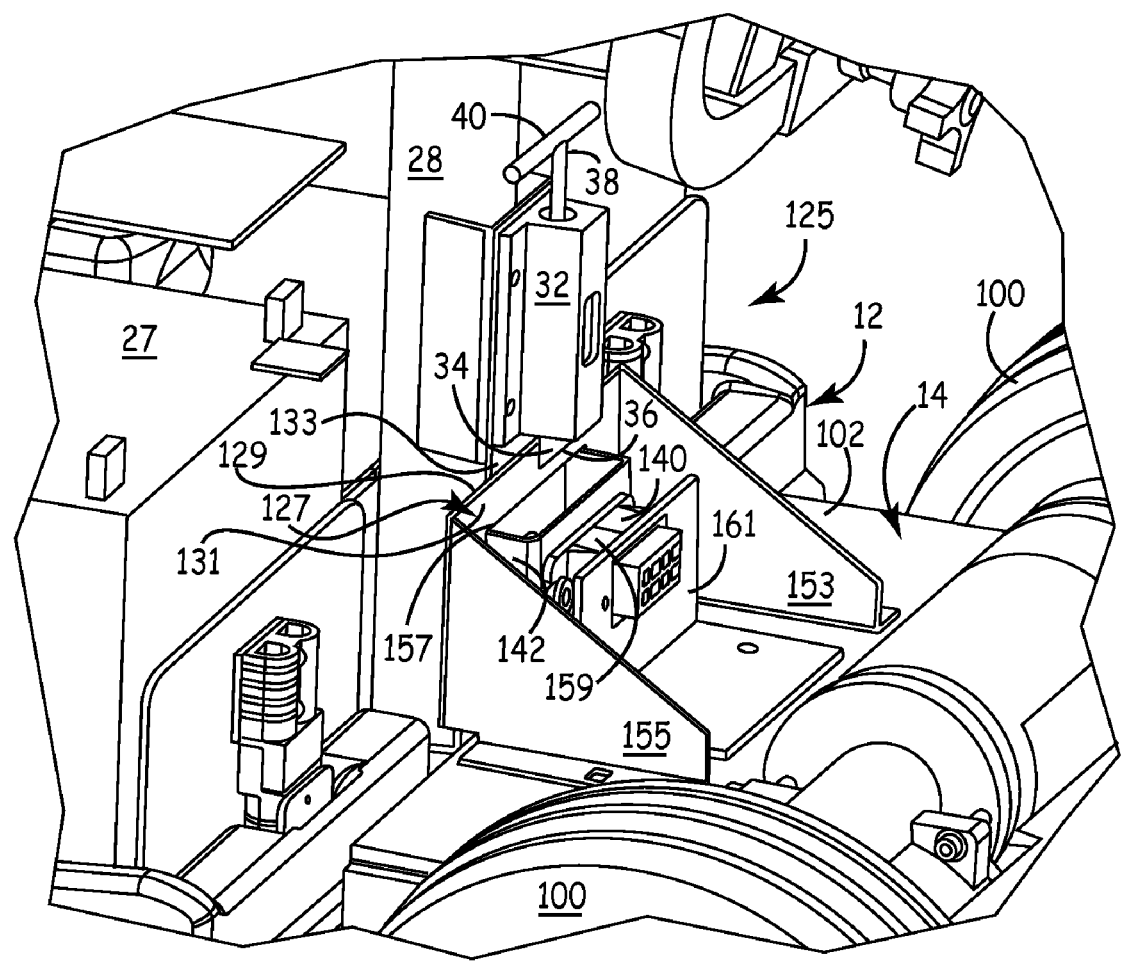
FIG. 3 is a further enlarged view of a portion of FIG. 1.

The vehicle 10 includes a connection assembly 125 for securing the front and rear units 12 and 14 together, as well as for guiding opposed electrical plug-in components on those units together and affirmatively electrically coupling those plug-in units. In FIG. 2, a portion of the removable seat 30 is seen, as mounted on the seat extension 28. FIGS. 2 and 3 also further illustrate the connection assembly 125, which in part includes a bracket 32 rigidly mounted to the seat extension 28 and including a latch 34 having a beveled edge 36. The latch 34 is biased to its extended position by a compression spring within the bracket 32 (see e.g., FIG. 4 of U.S. Pat. No. 5,238,082). An extension rod 38 connects the latch 34 to T-handle 40 for manual retraction of the latch 34 relative to the bracket 32.

The connection assembly 125 further includes a panel 127 mounted to the rear unit 14 to extend upwardly therefrom. The panel 127 has an upper edge 129 and a rear surface 131 which are adapted, when the front and rear units 12 and 14 are assembled (see, e.g., FIGS. 1, 2 and 3), to be engaged by the latch 34. The panel 127 is thus retained by and retained against an opposed rear facing surface 133 on the front unit 12. Upon assembly, the beveled edge 36 of the latch 34 allows the spring-loaded latch 34 to withdraw out of the way as the panel 127 is moved into place against the surface 133.

FIGS. 1-3 illustrate the components of the connection assembly 125 in an assembled configuration, thereby securing the front unit 12 to the rear unit 14.

Figure 4:
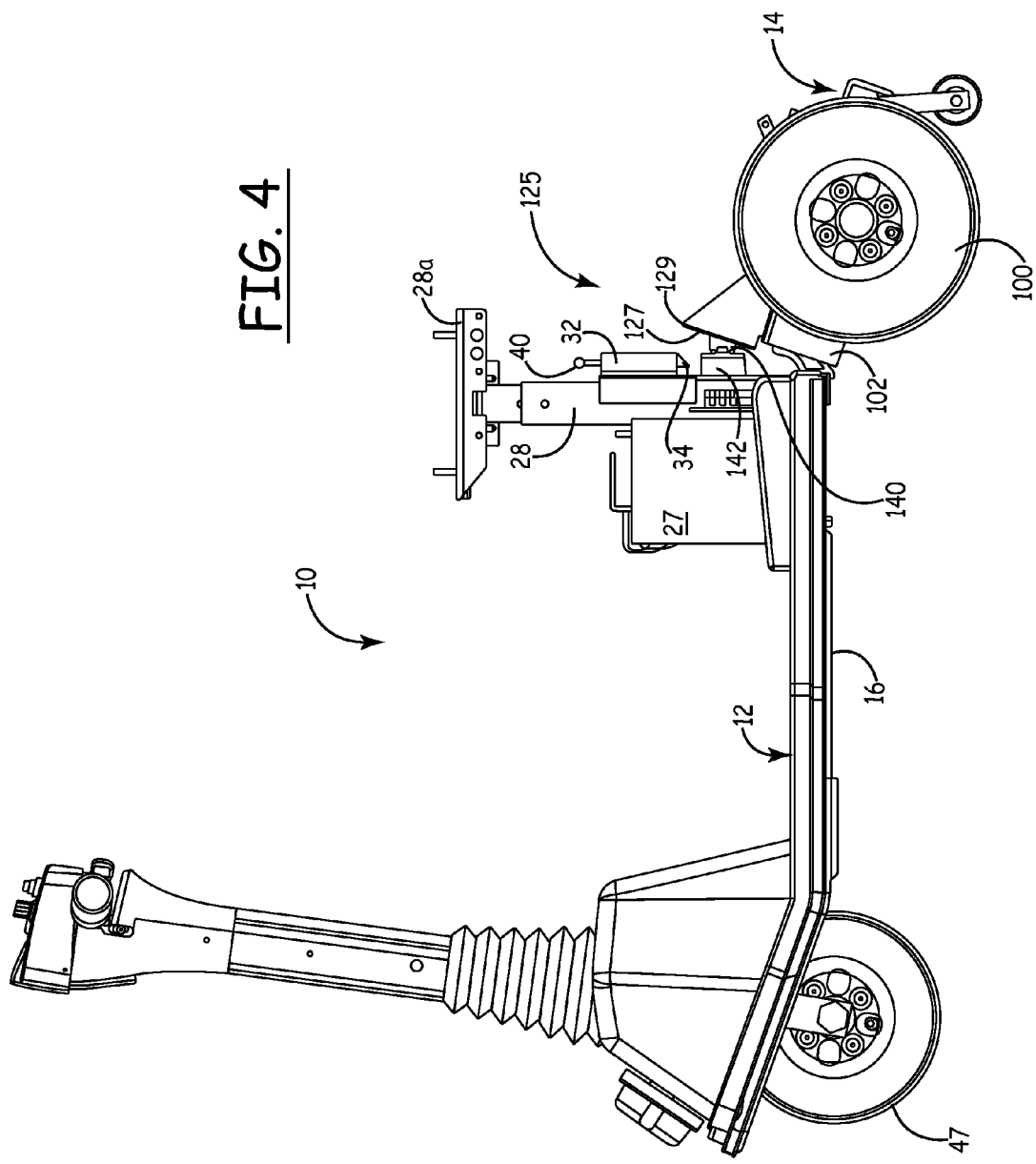
FIG. 4 is a side elevation view of the personal mobility vehicle of FIG. 1, showing partial separation of a front unit and rear unit thereof.
Figure 5:
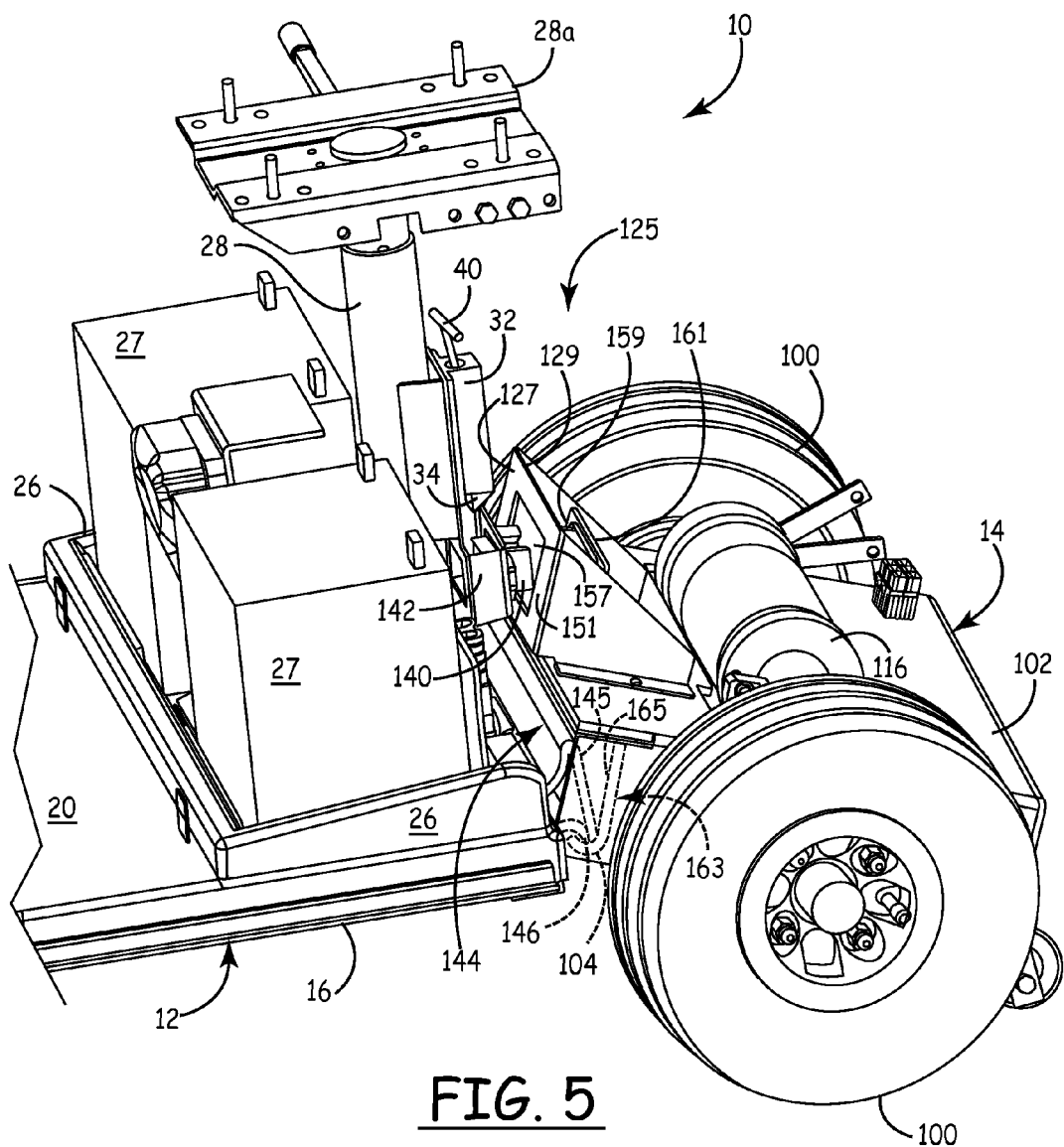
FIG. 5 is an enlarged isometric view of the personal mobility vehicle of FIG. 1, showing partial separation of the front unit from the rear unit.

FIGS. 4 and 5 illustrate the vehicle 10 in a partially disassembled configuration. In an exemplary embodiment, front unit 12 and rear unit 14 are tilted or pivoted apart relative to one another to facilitate such disassembly. The handle 40 is grasped and pulled upwardly relative to the bracket 32, thereby withdrawing the latch 34 into the bracket 32 and allowing the panel 127 and its upper edge 129 to move away from the rear facing surface 133 on the front unit 12.

Figure 6:
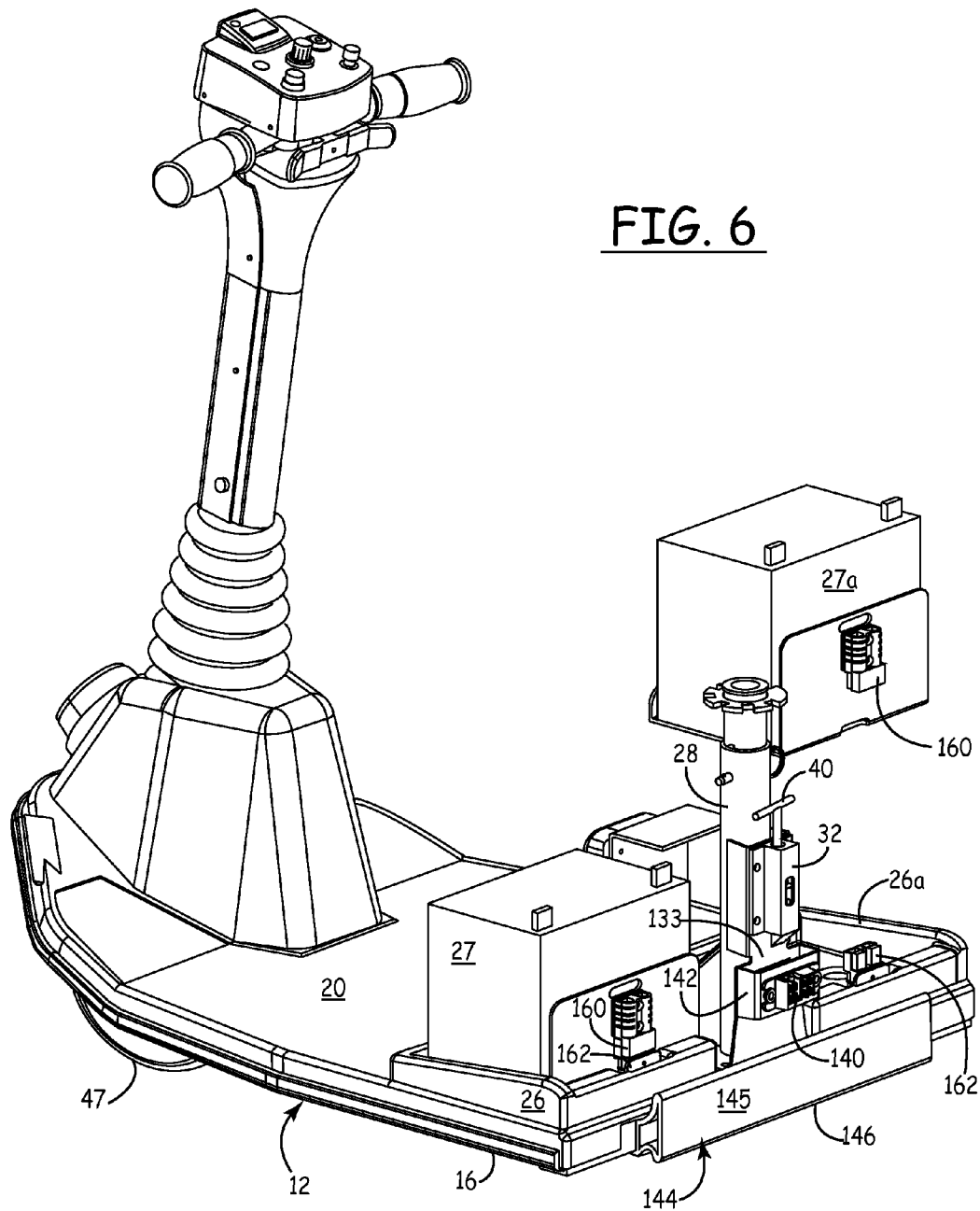
FIG. 6 is an isometric view of the front unit, fully separated from the rear unit.
Figure 7:
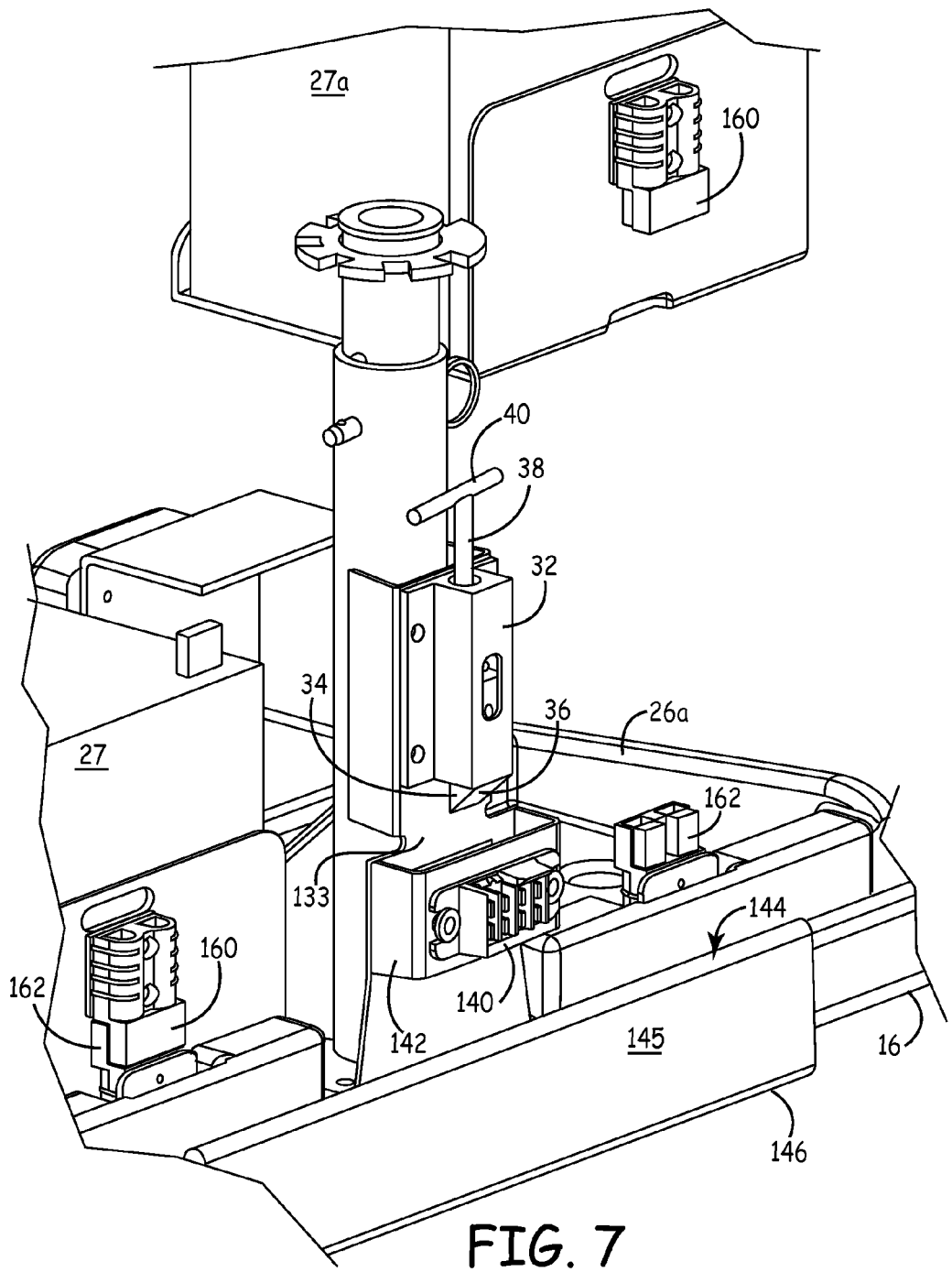
FIG. 7 is an enlarged view of a portion of FIG. 6.
Figure 8:
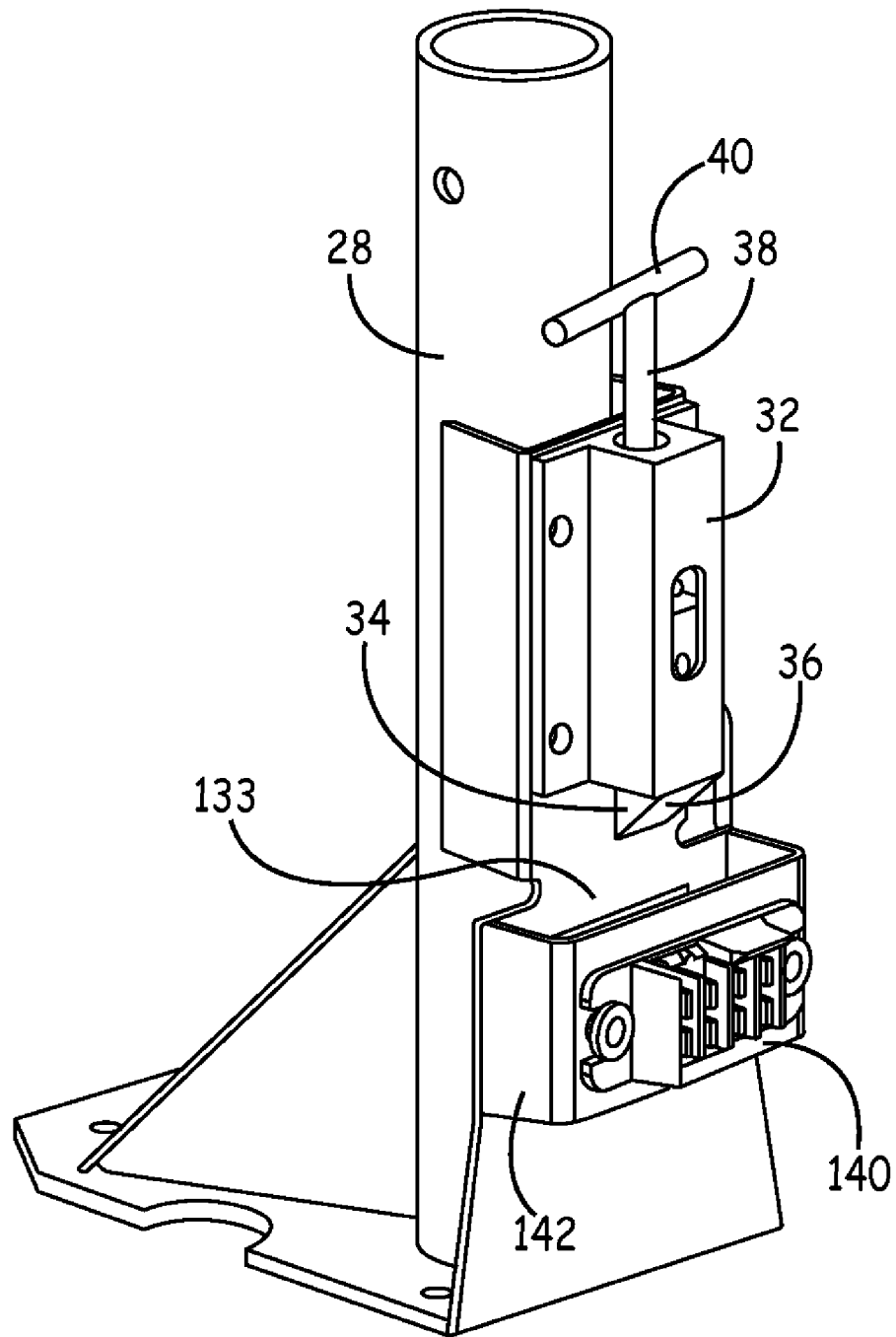
FIG. 8 is an isometric view of an exemplary seat post latch for connecting the front and rear units and a front plug-in assembly.

FIGS. 6, 7 and 8 illustrate portions of the connection assembly 125 of the front unit 12. The connection assembly 125 further includes a front electrical plug-in unit 140 which is fixedly mounted on a U-shaped bracket 142, which in turn is fixedly mounted to the frame 16 of the front unit 12. In the illustrated embodiment, the bracket 142 extends rearwardly from the surface 133 of the front unit 12. The front plug-in unit 140 thus is fixed in position relative to the surface 133 and projects outwardly therefrom and outwardly from the U-shaped bracket 142. FIG. 8 shows the sub-assembly of the seat extension 28, bracket 32, latch 34, surface 133, U-shaped bracket 142 and front plug-in unit 140, prior to its mounting upon the front unit 12.

FIGS. 6 and 7 also illustrate a bar 144 that is affixed to the frame 16 of the front unit 12. In the illustrated embodiment, the bar 144 projects rearwardly from the front unit 12. The bar 144 has a generally planar and vertically disposed face 145, with a lower lip portion 146 thereon. The bar 144 is disposed below the support 144 and its associated front plug-in unit 140.

Figure 9:
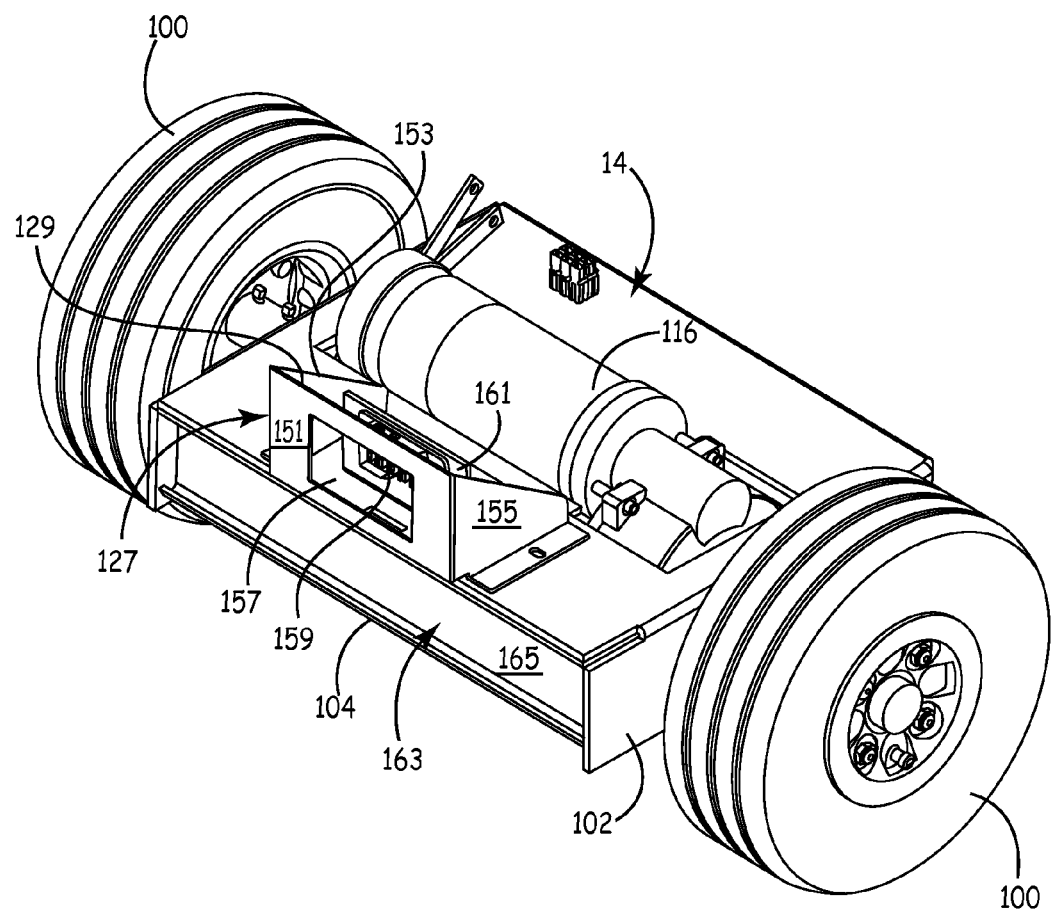
FIG. 9 is an isometric view of the rear unit, as viewed from a front, top and side orientation thereof.
Figure 10:
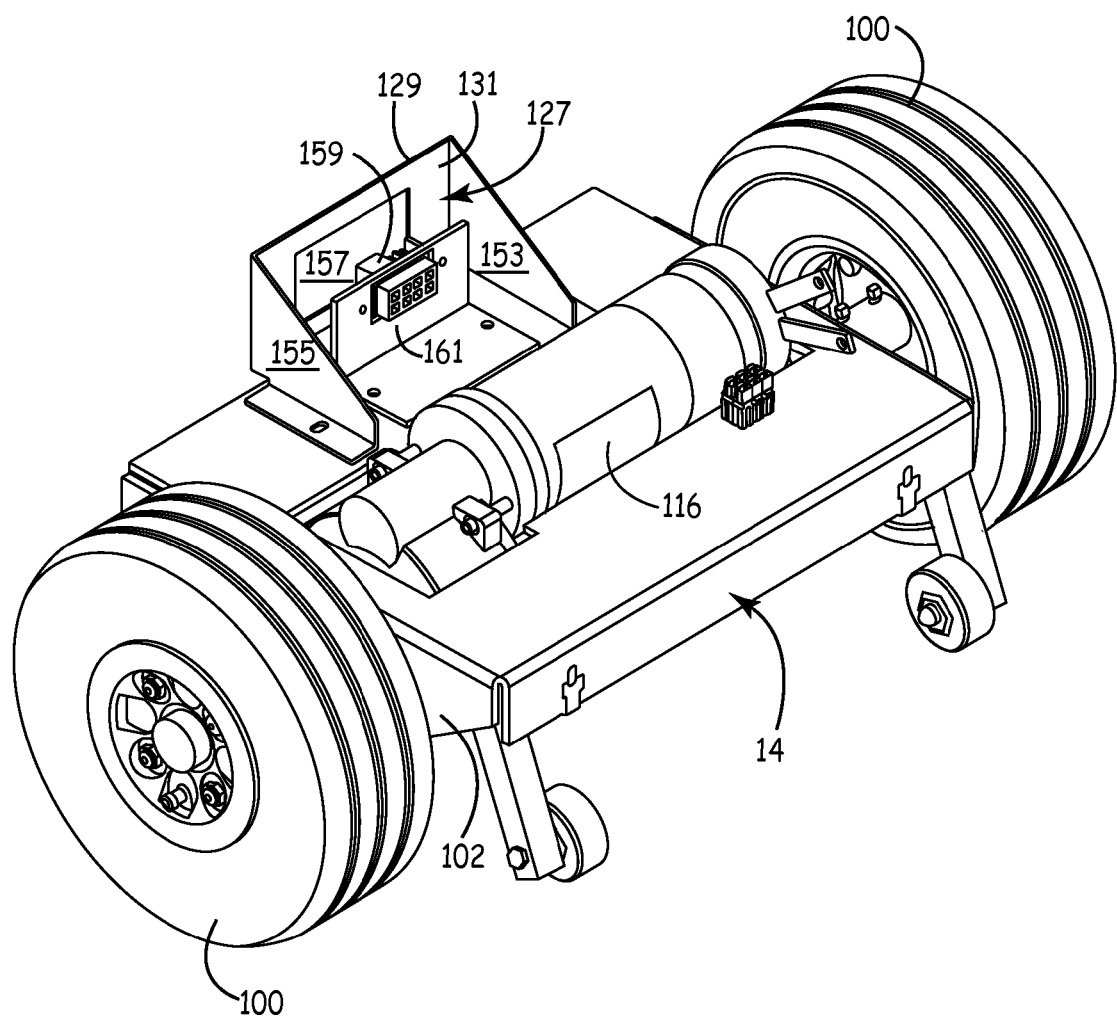
FIG. 10 is an isometric view of the rear unit, as taken from a rear, top and side orientation thereof.
Figure 11:
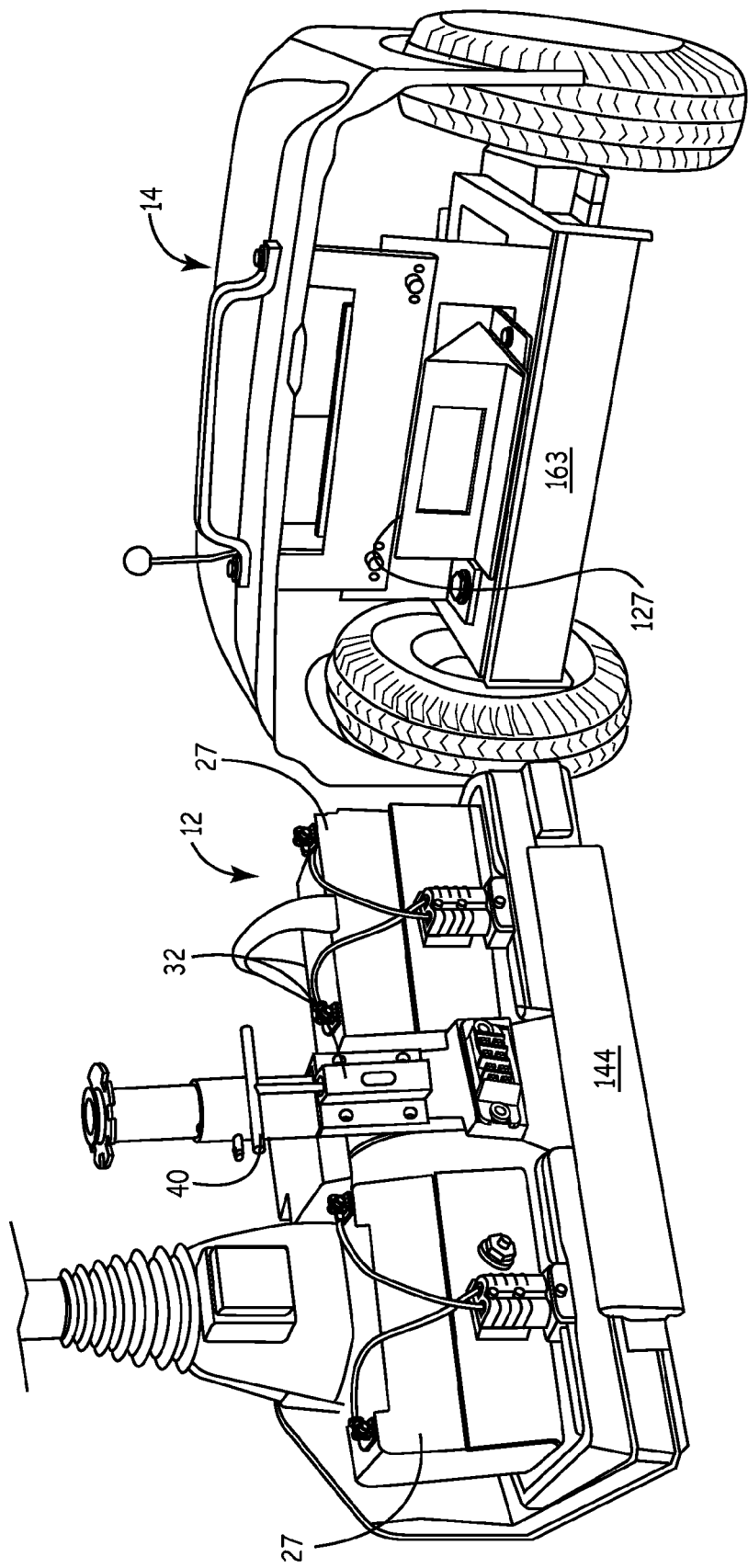
FIG. 11 is an isometric view showing the front and rear units of one embodiment of the personal mobility vehicle, fully separated.

FIGS. 9-10 illustrate portions of an exemplary embodiment of the connection assembly 125 of the rear unit 14, in a completely separated state from the front unit 12. Panel 127 is planar on a front surface 151 thereof. The panel 127 is mounted to the rear unit 14 via rearwardly extending support gussets 153 and 155. The panel 127 has an aperture 157 therethrough. In an exemplary embodiment, the aperture 157 is shaped to closely conform to the outer shape of the U-shaped bracket 142 on the front unit 12. A rear plug-in unit 159 is fixedly mounted to the frame 102 of the rear unit 14 by a mounting bracket 161. The rear plug-in unit 159 is spaced rearwardly from the opening 157. The rear unit 14 also includes a bar 163 with a J-hook 104 formed at a lower edge thereof, with the J-hook 104 and extending forwardly therefrom, below the panel 127 and rear plug-in unit 159. The bar 163 has a planar vertical surface 165 extending upwardly from the J-hook 104.

Upon assembly of the front unit 12 and rear unit 14, the surfaces 133 and 151 abut, the faces 145 and 165 abut, and the plug-in units 140 and 159 are affirmatively joined together and coupled for electrical continuity between the units. When those features are aligned as mentioned above, the bracket 142 projects rearwardly through the aperture 157, to facilitate the coupling of the plug-in units 140 and 159. This assembled configuration is illustrated in FIGS. 1-3. With the front and rear units assembled, the face 145 of the bar 144 engages and confronts against the face 165 of the bar 163 (i.e., against the broad leg of the J-hook 104). As a result, any downward force, such as the weight of the vehicle 10 or a rider, is supported at the connection by compression force of bar 144 against the J-hook 104. In the illustrated embodiment, the opposed surfaces 133 and 151 are shown as generally planar, and the opposed faces 145 and 165 are shown as generally planar. These surfaces and faces need not necessarily be planar, but are complementary in an exemplary embodiment so that affirmative and consistent coupling is achieved between the vehicle units, while allowing for a rugged connection between the units.

FIGS. 4 and 5 illustrate the U-shaped bracket 142 just as it is aligned for entry (or removal) relative to the aperture 157. While the aperture 157 is shown in the figures as a polygon shape (e.g., rectangular), to mate with the outer configuration of the U-shaped bracket, it is contemplated that other shapes will suffice. For instance, one plug-in unit may be mounted on a cone-shaped structure, while the other is mounted relative to a circular aperture on another structure that is shaped to mate with the cone-shaped structure. Likewise, one plug-in unit may be mounted on a pyramidal shaped feature, while the other plug-in unit is mounted relative to an aperture shaped to mate with a portion of the pyramidal feature. Any combination of cooperating plug-in support and aperture shapes will suffice, so long as the function of guiding the two opposed electrical plug-ins together for affirmative electrical and/or mechanical coupling thereof is achieved, thereby electrically coupling the front unit 12 and the rear unit 14 without the need for separate manual assembly of cable plug-ins (or upon disassembly, the need for manual separation of cable plug-ins). The electrical couplings between the front unit 12 and rear unit 14 are thus automatically made when the two units are assembled.

The present disclosure illustrates a break-apart scooter design that has fixed electrical receptacles that connect and disconnect as the components of the scooter are put together and taken apart. The mounting brackets that fasten the electrical receptacles together cooperate to ensure the alignment of the electrical connection. One bracket fits snugly through a hole of essentially the same size in a mating opposed bracket, with each bracket being mounted on alternate sections of the scooter. This assures the alignment of the electrical connectors as the two halves of the scooter are put together. For clarity of illustration, the electrical cables connected to the plug-in units 140 and 159 are not shown in the drawings, except for in FIGS. 13 and 14 (e.g., as electrical cables 240 and 259, respectively).

FIGS. 4 and 5 illustrate partial tipping of one half of the scooter relative to the other half. In these illustrations, the J-hook 104 on the rear unit 14 is still in communication and receives the bottom edge 146 of the bar 144 on the front unit 12. However, the plug-in units 140 and 159 have been separated, and the front surface 151 of the panel 127 has been separated from the rear facing surface 133 on the front unit 12. When fully assembled, the rear surface 133 and the front surface 151 are in opposed abutting alignment. The relationship between the bar 144 and the bar 163 is best seen in FIG. 5, where the front unit 12 and the rear unit 14 are partially tipped apart relative to one another. The bar 144 still rests on the J-hook 104, but the opposed faces 145 and 165 of the bar 144 and panel 163, respectively, have been tilted apart. When fully assembled, those faces are in abutting relationship. Complete separation of the front unit 12 and rear unit 14 is achieved by simply lifting the bar 144 out of engagement with the J-hook 104, once the units have sufficiently been tipped apart (see, e.g., FIGS. 2, 3 and 4 of U.S. Pat. No. 5,238,082).

Figure 12:
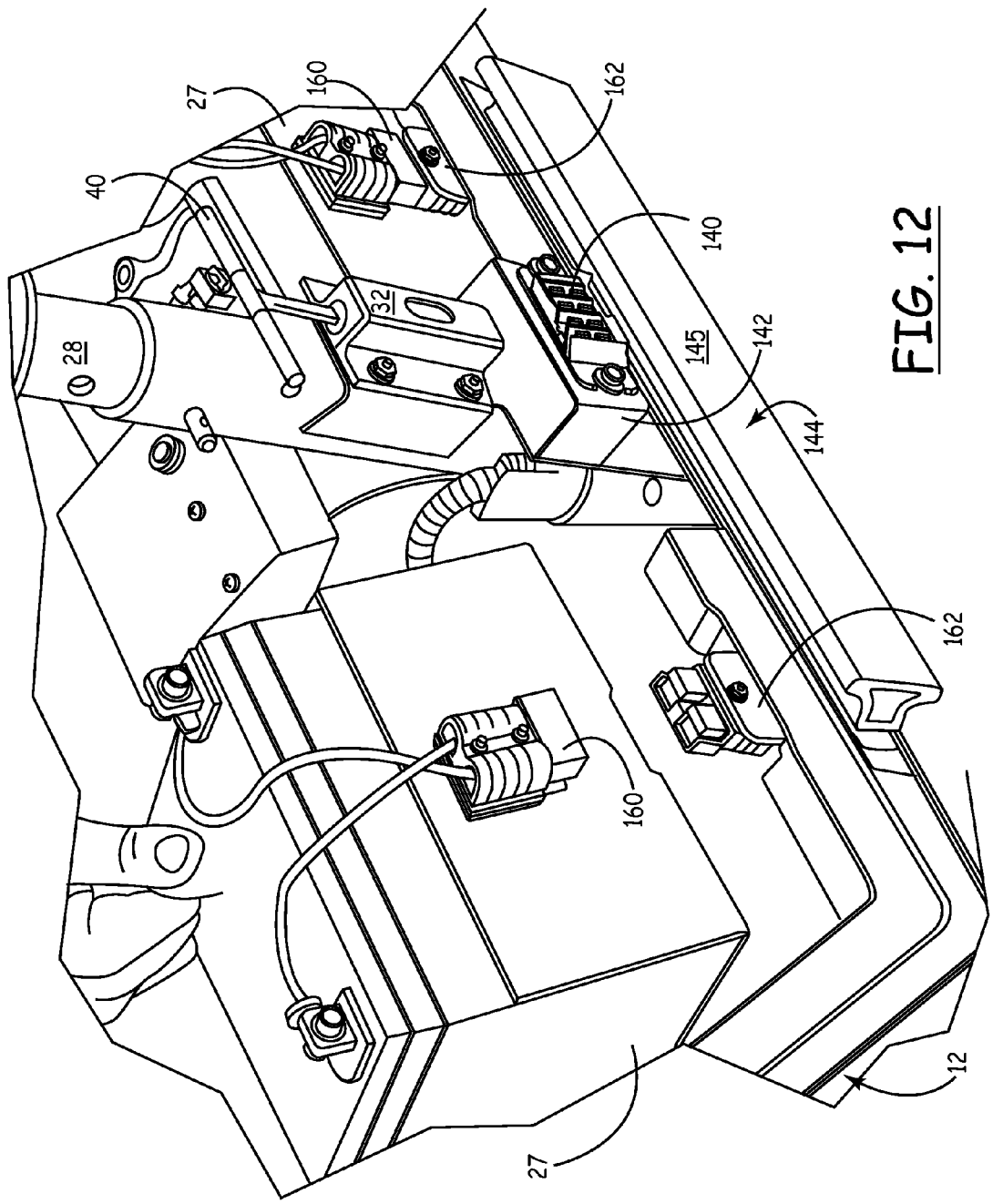
FIG. 12 is a partial isometric view illustrating partial separation of a battery pack of the front unit.
Figure 13:
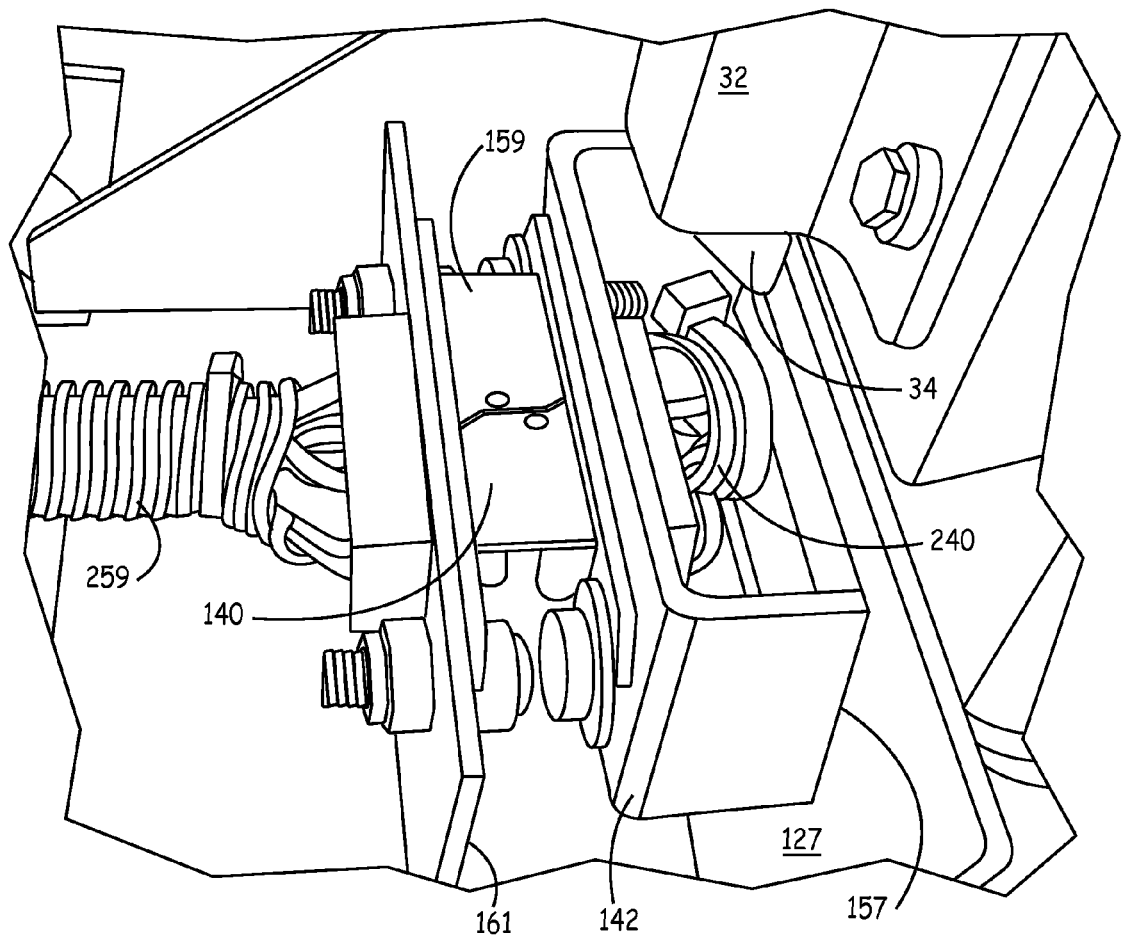
FIG. 13 is a partial isometric view of the plug-in assembly between the front unit and rear unit, in an assembled configuration.
Figure 14:
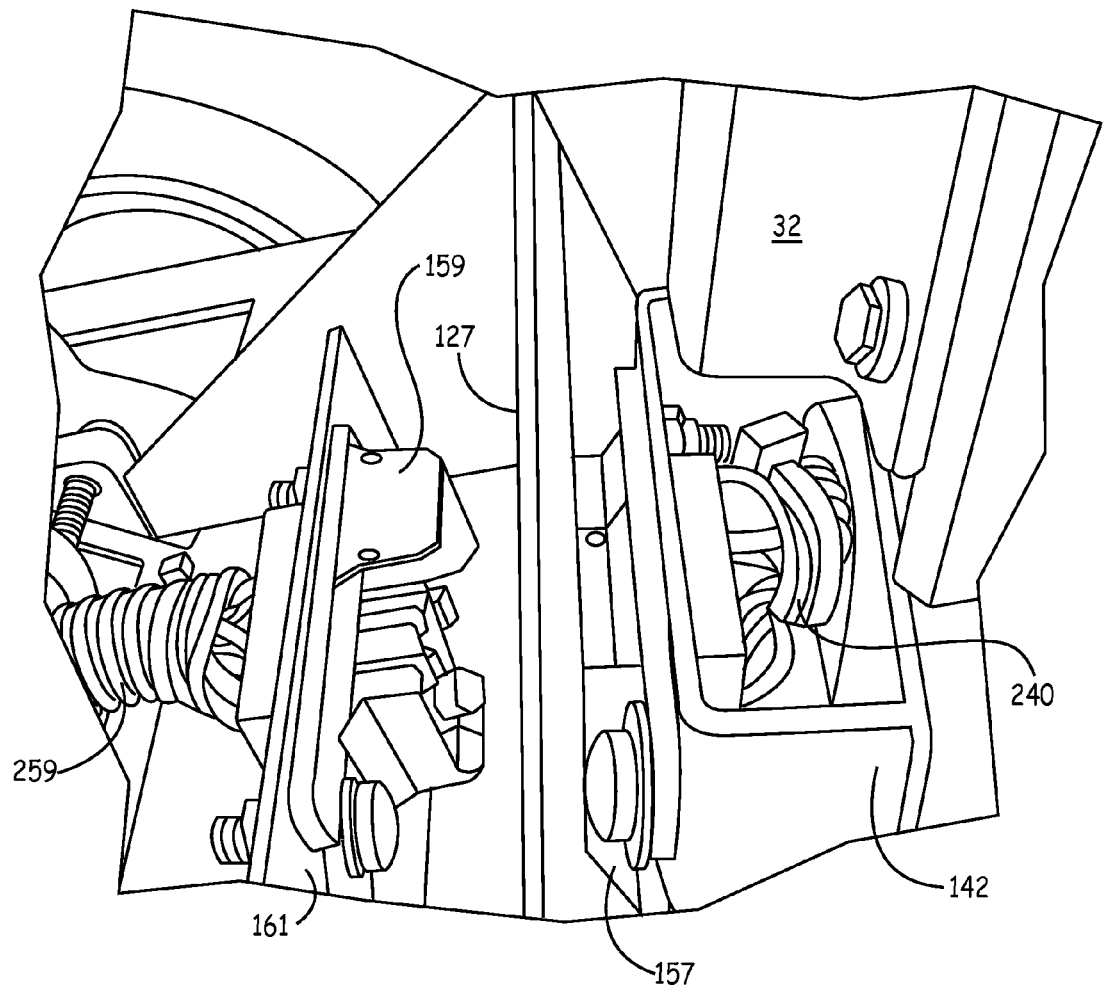
FIG. 14 is a partial isometric view of the plug-in assembly of FIG. 13, in a partially disassembled configuration.

FIG. 11 illustrates the front unit 12 and the rear unit 14 completely separated and sitting side by side. As shown in FIGS. 6 and 7, each battery is also separable from the front unit 12 and has an associated automatic plug-in feature for its electrical connection thereto. A battery plug 160 is affixed to each battery 27, and is received electrically (and mechanically) within a receiver 162 affixed to the first unit 12. FIGS. 6 and 7 illustrate one of the batteries (labeled as battery 27a) separated and spaced above the front unit 12. The battery connector 160 is affixed to the battery 27a and is aligned directly above the receiver 162. FIG. 12 illustrates removal of one of the batteries 27, and the ease of separation of the connector 160 and receiver 162 associated therewith. A cover for the batteries on the vehicle is not shown in the drawings, for clarity of illustration.

The present disclosure presents a break-apart scooter or personal mobility vehicle (e.g., powered wheelchair) which has electrical connectors which can be electrically and/or mechanically coupled between the front and rear sections of the scooter. The coupling is facilitated by mechanical guiding of the electrical connectors together by an associated connector mounting post and framing structures, such as the illustrated U-shaped bracket 142 and the aperture 157 in the panel 127. Alternative configurations for components to achieve this end are contemplated, so long as once the front and rear units of the scooter are assembled, the electrical couplings are urged together to electrically couple the scooter sections together and are coupled in a way that makes dislodgment of that coupling highly unlikely because of the affirmative mechanical connections and the structures surrounding those couplings. Thus, a more positive coupling arrangement is achieved, while simplifying the act of assembling or disassembling the scooter sections.

In all cases, this disclosure presents the connection assembly by way of representation and not limitation. It should be understood that numerous other modifications and embodiments can be devised by those skilled in the art which fall within the scope and spirit of the principles of this disclosed subject matter.

What is claimed is:

1. A connection assembly for electrically coupling a first electrical plug-in unit and a second electrical plug-in unit of a personal mobility vehicle comprising a first vehicle unit and a second vehicle unit, the connection assembly comprising:
   the first electrical plug-in unit, which is fixedly mounted to the first vehicle unit, comprises a first plurality of electrical wires, and comprises an outer configuration;
   the second electrical plug-in unit, which is fixedly mounted to the second vehicle unit and comprises a second plurality of electrical wires; and
   a guide disposed on the second vehicle unit and intermediate the first electrical plug-in unit and the second electrical plug-in unit, the guide comprising a vertical panel comprising an aperture sized to accept the outer configuration of the first electrical plug-in unit.

2. The connection assembly of claim 1 wherein the first vehicle unit is a front vehicle unit.

3. The connection assembly of claim 1 wherein the aperture comprises a shape that closely conforms with the outer configuration of the first electrical plug-in unit.

4. The connection assembly of claim 3 wherein the aperture is a rectangle.

5. The connection assembly of claim 1 wherein the guide comprises a panel disposed on the second vehicle unit.

6. The connection assembly of claim 5 wherein the panel contacts the first vehicle unit when the first vehicle unit and the second vehicle unit are connected.

7. The connection assembly of claim 6 wherein the first vehicle unit comprises a latch that holds the panel in contact with the first vehicle unit.

8. A method of electrically coupling a first electrical plug-in unit and a second electrical plug-in unit of a personal mobility vehicle comprising a first vehicle unit and a second vehicle unit, wherein the first electrical plug-in unit is fixedly mounted to the first vehicle unit, comprises a first plurality of electrical wires, and comprises an outer configuration, and wherein the second electrical plug-in unit is fixedly mounted to the second vehicle unit and comprises a second plurality of electrical wires, the method comprising:
   guiding an outer configuration of the first electrical plug-in unit through an aperture disposed on a vertical panel on the second vehicle unit while connecting the first vehicle unit and the second vehicle unit.

9. The method of claim 8 wherein the aperture is disposed on a panel of the second vehicle unit and wherein connecting the first vehicle unit and the second vehicle unit comprises contacting the panel to the first vehicle unit.

10. A connection assembly for electrically coupling a front electrical plug-in unit and a rear electrical plug-in unit of a personal mobility vehicle comprising a front vehicle unit and a rear vehicle unit, the connection assembly comprising:

the front electrical plug-in unit, which is fixedly mounted to the front vehicle unit, comprises a first plurality of electrical wires, and comprises a generally rectangular outer configuration;

the rear electrical plug-in unit, which is fixedly mounted to the rear vehicle unit and comprises a second plurality of electrical wires; and a guide comprising a vertical panel disposed on the rear vehicle unit and intermediate the front electrical plug-in unit and the rear electrical plug-in unit, the guide comprising a rectangular aperture disposed on the vertical panel and sized to accept the outer configuration of the first electrical plug-in unit, wherein the panel contacts the first vehicle unit when the first vehicle unit and the second vehicle unit are connected, and wherein to first vehicle unit comprises a latch that holds the panel in contact with the first vehicle unit.

* * * * *